Figure 1:
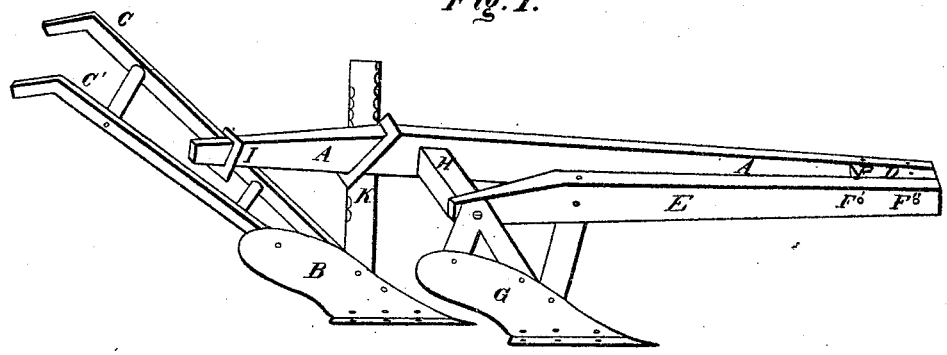

C. BATES.

Improvement in Plows.

No. 130,180.  Patented Aug. 6, 1872.

Witnesses:
Richard Z. Stuart
E. H. Walker

Inventor:
Charles Bates

UNITED STATES PATENT OFFICE.

CHARLES BATES, OF WARSAW, ILLINOIS.

IMPROVEMENT IN PLOWS.

Specification forming part of Letters Patent No. 130,180, dated August 6, 1872.

*To all whom it may concern:*

I, CHARLES BATES, of Warsaw, Illinois, have made a new and useful Improvement in Plows, of which the following is a specification:

This invention relates to breaking-plows; and consists in a construction and arrangement by which the apparatus will form a gang of two similar breaking-plows without supporting-wheels, and can be made to act as subsoil-plow, and also can be transformed into a single plow.

Figure 1 of drawing shows a side view of the plows arranged in a gang.

The main beam A bears a plow, B, and handles C C', for guiding. To one side of beam A, at D, is attached a second beam, E. Between A and E is a block, F, and bolts F' F'', or other means are used to hold the three in position. The beam E bears a plow, G, to cut a second furrow. The back end of beam E is attached to and held at a proper distance from beam A by part H between them. The plow G is set a proper distance forward of plow B to avoid interference with its furrow. Thus, as shown, the two plows throw similar furrows and help to hold each other up properly without requiring wheels, as usual to gang-plows. They are guided by the handles C C' or otherwise. The standard of plow B is attached to beam A so the plow may be raised or lowered in relation to the beam, and fixed at any height. The back end of beam A and the handles at I are also correspondingly adjustable. The standard K has notches in its rear face, into which the binding-clamp fits to hold as fixed.

When it is desired to use as a subsoil-plow the plow B is raised the distance required between the bottom and top furrows, and the draft-clevis is changed from a place between the two beams to one before the plow B, so that the plow G will run in the furrow made by plow B on the previous passage and throw a furrow from its bottom, while plow B cuts a new furrow, to be subsoiled at the next passage. The beam E and plow G may be removed, leaving only a simple single plow when desired.

I claim—

The beam A having the adjustable standard K, and being adjustably secured to the handle C, and having the detachable angular beam E, when the several parts are constructed and arranged to be operated as and for the purpose specified.

CHARLES BATES.

Witnesses:
SAML. J. WALLACE,
L. B. KENNEDY.